(12) United States Patent
Reiffel

(10) Patent No.: US 7,161,581 B2
(45) Date of Patent: Jan. 9, 2007

(54) ANNOTATING IMAGED DATA PRODUCT

(76) Inventor: Leonard Reiffel, 602 Deming Pl., Chicago, IL (US) 60614

( * ) Notice: Subject to any disclaimer, the term of this patent is extended or adjusted under 35 U.S.C. 154(b) by 445 days.

(21) Appl. No.: 10/344,483

(22) PCT Filed: Aug. 15, 2001

(86) PCT No.: PCT/US01/25500

§ 371 (c)(1),
(2), (4) Date: Feb. 11, 2003

(87) PCT Pub. No.: WO02/17037

PCT Pub. Date: Feb. 28, 2002

(65) Prior Publication Data

US 2004/0125224 A1 Jul. 1, 2004

Related U.S. Application Data

(60) Provisional application No. 60/226,183, filed on Aug. 18, 2000, provisional application No. 60/238,952, filed on Oct. 10, 2000, provisional application No. 60/256,086, filed on Dec. 15, 2000.

(51) Int. Cl.
*G09G 5/00* (2006.01)
*G06K 7/00* (2006.01)

(52) U.S. Cl. ...................... 345/156; 235/435
(58) Field of Classification Search .......... 235/462.11, 235/462.24, 462.41, 435; 348/333.02; 345/156
See application file for complete search history.

(56) References Cited

U.S. PATENT DOCUMENTS

| | | | |
|---|---|---|---|
| 4,053,233 A | 10/1977 | Bien et al. | |
| 4,099,050 A | 7/1978 | Sauermann | |
| 4,228,430 A | 10/1980 | Iwamura et al. | |
| 4,439,672 A | 3/1984 | Salaman | |
| 4,603,231 A | 7/1986 | Reiffel et al. | |
| 4,637,797 A | 1/1987 | Whitney et al. | |
| 4,650,334 A | 3/1987 | Alster et al. | |
| 4,684,349 A | 8/1987 | Ferguson et al. | |
| 4,857,716 A * | 8/1989 | Gombrich et al. | 235/375 |
| 4,945,914 A | 8/1990 | Allen | |
| 4,998,441 A | 3/1991 | Stuart | |
| 5,107,350 A | 4/1992 | Omori | |
| 5,111,410 A | 5/1992 | Nakayama et al. | |
| 5,181,015 A | 1/1993 | Marshall et al. | |
| 5,214,414 A | 5/1993 | Levine et al. | |
| 5,237,163 A * | 8/1993 | Collins et al. | 235/462.25 |
| 5,260,556 A | 11/1993 | Lake et al. | |
| 5,282,045 A | 1/1994 | Mimura et al. | |
| 5,415,553 A | 5/1995 | Szmidla | |
| 5,448,261 A | 9/1995 | Koike et al. | |
| 5,453,015 A | 9/1995 | Vogel | |

(Continued)

FOREIGN PATENT DOCUMENTS

EP 0 062 473 10/1982

(Continued)

*Primary Examiner*—Alexander Eisen
(74) *Attorney, Agent, or Firm*—William J. Hallihan

(57) ABSTRACT

The annotating product adapted for use with an information system and with an exhibit having a plurality of objects has an imager (11) which is signal connected to the information system (91) and has codes (31) representing (33) objects (81) from the plurality of objects, the imager detecting light (32) from several codes together and sending an indicate signal (12) which represents at least one of the several objects to the information system which then sends an annotate signal (22) to cause a display (21) to output data about objects represented by the indicate signal.

27 Claims, 1 Drawing Sheet

U.S. PATENT DOCUMENTS

Figure 1:
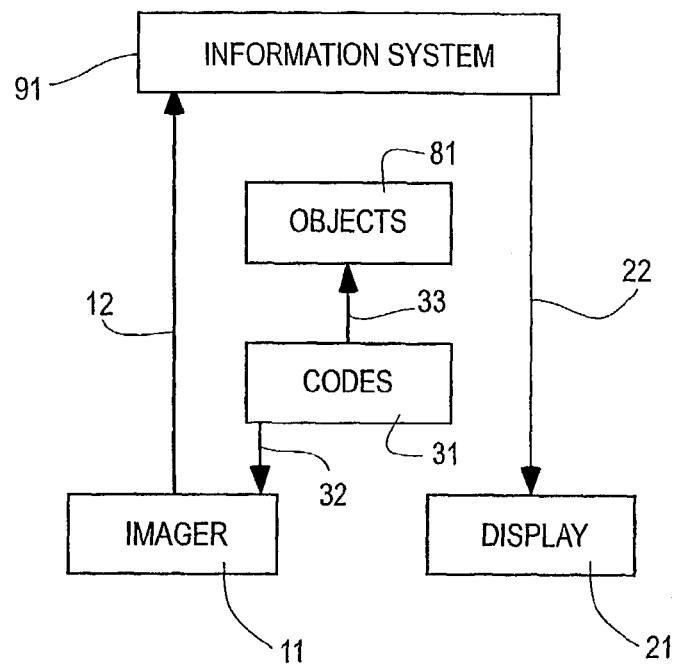

| | | | |
|---|---|---|---|
| 5,507,527 A | 4/1996 | Tomioka et al. | |
| 5,537,211 A | 7/1996 | Dial | |
| 5,563,401 A | 10/1996 | Lemelson | |
| 5,644,126 A | 7/1997 | Ogawa | |
| 5,710,416 A | 1/1998 | Belknap et al. | |
| 5,712,658 A | 1/1998 | Arita et al. | |
| 5,729,220 A | 3/1998 | Russell | |
| 5,756,981 A | 5/1998 | Roustaei et al. | |
| 5,789,732 A | 8/1998 | McMahon et al. | |
| 5,795,161 A | 8/1998 | Vogel | |
| 5,821,523 A | 10/1998 | Bunte et al. | |
| 5,822,735 A | 10/1998 | De Lapa et al. | |
| 5,825,045 A | 10/1998 | Koenck et al. | |
| 5,826,578 A | 10/1998 | Curchod | |
| 5,835,237 A | 11/1998 | Ebrahimi | |
| 5,852,211 A | 12/1998 | Dumpelmann et al. | |
| 5,852,823 A | 12/1998 | De Bonet | |
| 5,867,265 A | 2/1999 | Thomas | |
| 5,912,700 A | 6/1999 | Honey et al. | |
| 5,917,472 A | 6/1999 | Perala | |
| 5,917,486 A | 6/1999 | Rylander | |
| 5,963,145 A | 10/1999 | Escobosa | |
| 5,982,352 A | 11/1999 | Pryor | |
| 5,988,505 A | 11/1999 | Shellhammer | |
| 6,000,612 A | 12/1999 | Xu | |
| 6,047,893 A | 4/2000 | Saporetti | |
| 6,048,117 A | 4/2000 | Banton | |
| 6,056,199 A | 5/2000 | Wiklof et al. | |
| 6,082,619 A | 7/2000 | Ma et al. | |
| 6,118,848 A | 9/2000 | Reiffel | |
| 6,121,953 A | 9/2000 | Walker | |
| 6,155,489 A | 12/2000 | Collins, Jr. et al. | |
| 6,163,946 A | 12/2000 | Pryor | |
| 6,167,607 B1 | 1/2001 | Pryor | |
| 6,283,375 B1 * | 9/2001 | Wilz et al. | 235/462.45 |
| 6,301,763 B1 | 10/2001 | Pryor | |
| 6,311,214 B1 | 10/2001 | Rhoads | |
| 6,314,631 B1 | 11/2001 | Pryor | |
| 6,317,118 B1 | 11/2001 | Yoneno | |
| 6,317,953 B1 | 11/2001 | Pryor | |
| 6,330,973 B1 | 12/2001 | Bridgelall et al. | |
| 6,335,685 B1 | 1/2002 | Schrott et al. | |
| 6,542,083 B1 | 4/2003 | Richley et al. | |
| 6,545,670 B1 | 4/2003 | Pryor | |
| 6,708,885 B1 | 3/2004 | Reiffel | |
| 6,720,949 B1 | 4/2004 | Pryor et al. | |
| 6,750,848 B1 | 6/2004 | Pryor | |
| 6,766,036 B1 | 7/2004 | Pryor | |
| 2002/0036617 A1 | 3/2002 | Pryor | |
| 2002/0183961 A1 | 12/2002 | French et al. | |
| 2003/0222145 A1 | 12/2003 | Reiffel | |
| 2004/0027455 A1 | 2/2004 | Reiffel | |
| 2004/0041027 A1 | 3/2004 | Reiffel | |
| 2004/0125224 A1 | 7/2004 | Reiffel | |
| 2004/0135766 A1 | 7/2004 | Reiffel | |
| 2004/0188525 A1 | 9/2004 | Reiffel | |
| 2004/0195327 A1 | 10/2004 | Reiffel | |

FOREIGN PATENT DOCUMENTS

| | | |
|---|---|---|
| EP | 0 840 248 | 5/1998 |
| EP | 1 020 810 | 7/2000 |
| FR | 2 694 827 | 2/1994 |
| JP | 11-143629 | 5/1999 |
| WO | WO 87/07106 | 11/1987 |
| WO | WO 93/18478 | 9/1993 |
| WO | WO 96/32690 | 10/1996 |
| WO | WO 99/36836 | 7/1999 |
| WO | WO 99/66441 | 12/1999 |
| WO | WO 01/71397 | 9/2001 |
| WO | WO 01/84332 | 11/2001 |
| WO | WO 01/84475 | 11/2001 |
| WO | WO 02/17291 | 2/2002 |
| WO | WO 02/17293 | 2/2002 |
| WO | WO 02/48947 | 6/2002 |
| WO | WO 02/49340 | 6/2002 |
| WO | WO 02/49344 | 6/2002 |
| WO | WO 02/86807 | 10/2002 |

* cited by examiner

ANNOTATING IMAGED DATA PRODUCT

This application claims benefit of U.S. provisional application 60/226,183 filed 18 Aug. 2000, U.S. provisional application 60/238,952 filed 10 Oct. 2000, and U.S. provisional application 60/256,086 filed 15 Dec. 2000.

The annotating product—which is used with an information system and with objects—provides data about an object when the object is indicated via an imager which detects light from several coded data sources together.

The objects can be in various planned and unplanned arrangements such as exhibits of objects in a store window, in a store, in a gallery, and in a museum and such as objects everyday objects in private homes and in public places.

FIG. 1 schematically depicts the product.

Figure 2:
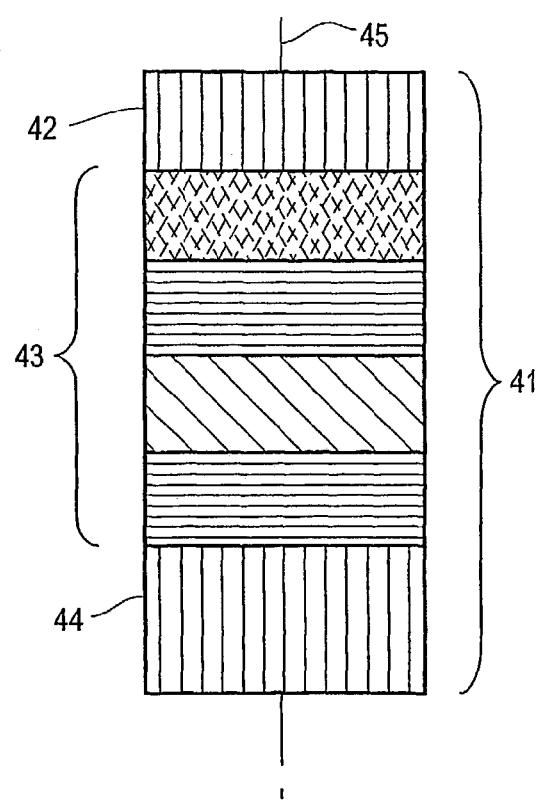

FIG. 2 depicts an example of light from a coded data source.

The annotating product is adapted for use with an information system and with a plurality of objects. The product comprises an imager 11 which is signal connected to the information system 91; comprises coded data sources 31 representing objects from the plurality of objects 81, with light 32 from the plurality of coded data sources being detected by the imager; comprises an indicate signal 12 which indicates via the imager to the information system objects from the plurality of objects; and comprises an annotate signal 22 from the information system which causes annotate data about the indicated objects to be made available to a person via a display 21.

"Person" here, and throughout, can not only mean a natural person, but also can mean various entities which can be animate and inanimate and which can be self acting and can be externally motivated.

The imager 11 has a field of view extending along each of three orthogonal axes. Several coded data sources—members of 31—from the plurality of coded data sources are spatially separated in the field of view. The imager detects light—members of 32—from the several coded data sources together.

"Detects light" here and throughout means not only detecting the presence of light but also means detecting the specific properties of the light—such as the color bands 43—which encode data so that the imager can output an indicate signal which represents the data. Detecting light from several data sources together distinguishes the imager from a bar code reader which can not detect light from several spatially separated bar codes together.

Light—41 for example—from a first coded data source—a member of 31—from the plurality of coded data sources represents a first object—a member of 81—from the several objects. A first indicate signal—a component of 12—is caused by the imager when light from the first coded data source is selected by the imager. The first indicate signal represents the first object. The first indicate signal is output by the imager and is input to the information system. A person can cause light from the first coded data source to be selected by the imager.

First annotate data associated with the first object is available to the information system. The first indicate signal causes the information system to output a first annotate signal—a component of 22—which represents the first annotate data. The first annotate signal is input to a display 21. The first annotate signal causes the display to output the first annotate data. The display can be visible to a person.

The imager can be a private imager. A plurality of object coded data sources can member-by-member correspond to object members from the plurality of coded data sources as indicated by 33. The first coded data source is a first object coded data source from the plurality of object coded data sources. Light from the first object coded data source is caused to be selected by data input to the private imager to select a representation of the first object coded data source output by the private imager.

The private imager can be part of a device such as a cell phone and a computer which can be signal connected to the information system. When the private imager detects light from the first object coded data source, the private imager can output a representation of the first object coded data source. This representation can then be selected by the person by any of various data input means such as key stroking, screen tapping, and computer mouse clicking.

The imager can be a public image. A plurality of person coded data sources can member-by-member correspond to person members from the plurality of coded data sources. A first person coded data source from the plurality of person coded data sources is the first coded data source. The first person coded data source is selected by the imager when a first alignment—a component of 33—of the first person coded data source is held for a set time.

In this public imager case the first person coded data source—41 for example—can have a first axis 45—defined for example by bands 42 and 44. The first alignment can be achieved by manipulating the first person coded data source so that the first axis intersects the first object. The first alignment represents the first object by intersecting the first object.

In the public imager case a plurality of object coded data sources can also member-by-member correspond to object members from the plurality of coded data sources. The plurality of object coded data sources member-by-member separately represent—components of 33—each object from the plurality of objects.

In this case the public imager can also detect light from several object coded data sources representing the several objects. The indicate signal can have an object component which represents the objects. Thus, even if objects have been moved—by forces which can be internal, external, and combinations thereof—the information system will have data about the first object when it is indicated by the first alignment.

In this case the first alignment can also be achieved by manipulating the first person coded data source to indicate the first object coded data source representing the first object. The first object coded data source can be selected—for example—by obscuring at least part of at least one of the first person coded data source color bands 43.

The information system can be adapted so that more than one of these alignment means can be used. The information system can be adapted so that the alignment means can be caused by various combinations of all of these alignment means.

In the private imager case many persons can be manipulating private imagers. For example a first person can manipulate a first private imager and cause a first indicate signal representing a first object while a second person can manipulate a second private imager and cause a second indicate signal representing a second object. The first person and the second person can cause a first indicate signal and a second indicate signal which represents the same object which can be the first object and can be the second object.

The first indicate signal from the first private imager can have a first person component which represents the first private imager and the second indicate signal from the second private imager can have a second person component which represents the second private imager. The first person component and the second person component can cause the first annotate signal and the second annotate signal here to have a first personal component representing first annotate data relevant specifically to the first person, and the second annotate signal to have a second personal component representing annotate data relevant specifically to the second person.

In the public imager case many persons can be manipulating many person coded data sources. A first person coded data source being aligned by a first person can have a portion—43 for example—which represents the first person, and a second person coded data source being aligned by a second person can have a similar, but distinct, portion which represents the second person.

The first indicate signal from the public imager can have a first person component which represents the first person and the second indicate signal from the public imager can have a second person component which represents the second person. The first person component and the second person component can cause the first annotate signal and the second annotate signal to have a first personal component representing first annotate data relevant specifically to the first person, and the second annotate signal to have a second personal component representing annotate data relevant specifically to the second person.

The display can have any of various forms which can be signal connected to the information system. The display can be a private display in the private imager case and in the public imager case. A private display can be any of various devices such as a cell phone and a computer. The display can be a public display in the public imager case and in the private imager case. A public display can be a large display which can be perceived by many persons. A large display can show annotate data intended for each of many persons. A public display can be projected to a location close to a person so that this display can be perceived by the person and only also by other persons close to the person.

The display can be various combinations of two and more of these. The display form can be tailored to the needs and wants of various persons indicating objects.

The display can be any data output means which can be perceived by a person such as visual, audible, and tactile means. The display can be combinations of these means. The display can be achieved by motions of a robot. The data output means can be tailored to the needs and wants of various persons indicating objects.

The indicate signal can have a query component. A query component can be caused by a person. Many query components can be caused by many persons together. A query component can request various specific reply data about the indicated object such the query "what colors are available?" relevant to merchandise and such as queries relevant to other exhibits of objects. The first annotate data can have a reply component which represents the first reply data.

A query component can be caused by a person manipulating a private imager to detect light from object coded data source. When light from the object coded data source is detected, the imager can give the person the opportunity to cause a query component by any of various data input means.

A query component can be caused by a person manipulating a person coded data source so that light from the person coded data source is detected by a public imager. The person coded data source can have a form like that depicted in FIG. 2 with color bands. Thus the query component can be caused for example by obscuring at least part of at least one of the person coded data source color bands.

The information system can be adapted so that more than one of these means can be used. The information system can be adapted so that the query component, and any second query component, can be caused by various combinations of these means.

When a person code has a component which identifies a person, a query can be answered with annotate data about the object particularly relevant to the person.

The imager can be the dual mode imager of patent application PCTUS/01/13742 filed 30 Apr. 2001. The coded data source depicted in FIG. 2 is a form which works well with the dual mode imager. The bands 42 and 44 retro reflect infra red light. The locate mode of the dual mode imager detects these bands. The react mode of the dual mode imager detects light from the region 43 over other light from the field of view. Band 44 is wider than band 41 defining a direction. Other imagers and other forms of coded data sources can be used.

The imager—dual mode and otherwise—can have components separated in space. This can enlarge the field of view. This can facilitate determining the spatial positions of coded data sources. The imager can have several elements which selectively detect portions of a range of values of a physical property of light from a coded data source, with the several portions detected by the several imager elements being combined to detect the full range of the physical property of light without forming an image of the coded data source.

Light from a coded data source can have various sources such as light reflected from ambient sources; a coded data source light source; light emitted after energizing by suitable radiation; light emitted after energizing by suitable radiation with a characteristic decay time; a light source adjacent to the imager illuminating the coded data source; and combinations of two and more of these.

Light is not limited to visible light. For example, infrared can be used, and millimeter and longer wavelengths can be used. Light can be radiating energy from any portion of the electromagnetic spectrum which can provide the functions required here. Other forms of radiating energy—such as acoustic energy—which can provide the functions required here are included in the meaning of "light" here.

A "signal" from a first product part to a second product part and a first product part being "signal connected" with a second product part here, and throughout, mean that a first physical state of the first product part causes a second physical state of the second product part. This can occur by various direct causal means and can occur by any of various transmission means. Transmitted signals can be any of various point-to-point and broadcast forms of energy transmission such as wireless and via wires, cables, and fibers. Parts of transmitted signals can reside with one form of the transmitted signal, parts can reside with a second form of transmitted signal, and parts can reside with various combinations of transmitted signals.

The several causes here can act via any of various processing modes. The processing can utilize configured processing elements such as fixed circuits, can utilize configurable processing elements such as field programmable gate arrays and neural networks, can utilize instructions in a data-bearing medium, and can utilize combinations of these. The processing be stand alone, can act via a local information system, can act via a networked information system, and can act via combinations of these. The processing—in part at least—can be a part of the imager.

The invention claimed is:

1. An annotating product used with an information system and with a plurality of objects, the product comprising:
   an imager, the imager having a field of view, the field of view extending along each of three orthogonal axes, a plurality of coded data sources, several coded data sources from the plurality of coded data sources being spatially separated in the field of view, light from the several coded data sources being together detected by the imager;
   a first object from the several objects;
   a first coded data source from the several coded data sources, light from the first coded data source representing the first object;
   a first indicate signal, the first indicate signal being caused when light from the first coded data source is caused to be selected at the imager, the first indicate signal representing the first object, the first indicate signal being output by the imager, the first indicate signal being input to the information system;
   first annotate data associated with the first object, the first annotate data being available to the information system;
   a first annotate signal output by the information system, the first annotate signal being caused by the first indicate signal, the first annotate signal having a first personal component, the first personal component representing first annotate data relevant specifically to a first person, the first annotate signal representing the first annotate data; and
   a display, the display receiving the first annotate signal and the display being caused by the first annotate signal to output the first annotate data.

2. The product of claim 1 wherein:
   the imager is a private imager;
   a plurality of object coded data sources member-by-member corresponds to object members from the plurality of coded data sources;
   the first coded data source is a first object coded data source from the plurality if object coded data sources; and
   light from the first object coded data source is caused to be selected by data input to the private imager to select a representation of the first object coded data source.

3. The product of claim 1 wherein:
   the imager is a public imager;
   a plurality of person coded data sources member-by-member corresponds to person members from the plurality of coded data sources;
   the first coded data source is a first person coded data source from the plurality of person coded data sources; and
   light from the first person coded data source is caused to be selected at the imager when a first alignment of the first coded data source is maintained for a set time, the first alignment representing the first object by intersecting the first object.

4. The product of claim 3 wherein:
   a plurality of object codes member-by-member corresponds to object members from the plurality of coded data sources, the several coded data sources in the field of view comprises a first object coded data source;
   the indicate signal has a first object component, and the first object component positionally represents the first object coded data source.

5. The product of claim 1 wherein the display is a private display.

6. The product of claim 1 wherein the display is a public display.

7. The product of claim 1 wherein the indicate signal has a first query component which solicits first reply data about the first object and wherein the first annotate data has a first reply component which represents the first reply data.

8. The product of claim 1 wherein:
   the indicate signal includes a query component, the query component being caused by a person, the query component represents a request for reply data about the first object; and
   the first annotate data having a first reply component, the reply component represents the first reply data.

9. The product of claim 8 wherein: the imager is a private imager and the private imager gives the person the opportunity to cause a query component when light from the first coded data source is detected.

10. The product of claim 3 wherein:
    the indicate signal includes a query component, the query component being caused by a person manipulating a person coded data source, the query component represents a request for reply data about the first object; and
    the first annotate data having a first reply component, the reply component represents the first reply data.

11. The product of claim 3 wherein:
    the indicate signal includes a query component, the query component being caused by a person obscuring at least part of at least one of the person coded data source, the query component represents a request for reply data about the first object; and
    the first annotate data having a first reply component, the reply component represents the first reply data.

12. The product of claim 1 wherein; the first reply data includes data about the object particularly relevant to the first person.

13. The product of claim 1 wherein:
    the imager is a first private imager; and the product further comprises
    a second private imager;
    the second imager having a field of view, the second field of view extending along each of three orthogonal axes, several coded data sources from the plurality of coded data sources being spatially separated in the second field of view, second light from the several coded data sources being together detected by the second imager;
    a second object from the several objects;
    a second coded data source from the several coded data sources, light from the second coded data source representing the second object;
    a second indicate signal, the second indicate signal related to light from the second coded data source selected at the second imager, the second indicate signal representing the second object, the second indicate signal being output by the second imager, the second indicate signal being input to the information system;
    second annotate data associated with the second object, the second annotate data being available to the information system;
    a second annotate signal output by the information system, the second annotate signal being caused by the first indicate signal, the second annotate signal having a second personal component, the second personal component representing second annotate data relevant specifically to a second person;
    the second annotate signal representing the second annotate data; and the display receiving the second annotate signal and the display being caused by the second annotate signal to output the second annotate data.

14. The product of claim 13 wherein the first indicate signal and the second indicate signal represent the same object which can be the first object and can be the second object.

15. An annotating product used with an information system and with a plurality of objects, the product comprising:
a private imager, the private imager having a field of view, the field of view extending along each of three orthogonal axes, a plurality of coded data sources;
a plurality of object coded data sources member-by-member corresponding to the plurality of coded data sources;
several object coded data sources from the plurality of object coded data sources being spatially separated in the field of view, light from the several object coded data sources being together detected by the private imager;
a first object from the several objects;
a first object coded data source from the several object coded data sources;
light from the first object coded data source representing the first object;
a first indicate signal, the first indicate signal being caused when light from the first object coded data source is caused to be selected by data input to the private imager to select a representation of the first object coded data source, the first indicate signal representing the first object code, the first indicate signal being output by the private imager, the first indicate signal being input to the information system;
first annotate data associated with the first object, the first annotate data being available to the information system;
a first annotate signal output by the information system, the first annotate signal being caused by the first indicate signal, the first annotate signal having a first personal component, the first personal component representing first annotate data relevant specifically to a first person, the first annotate signal representing first annotate data; and
a display, the display receiving the first annotate signal and the display being caused by the annotate signal to output the first annotate data.

16. The product of claim 15 wherein the display is a private display.

17. The product of claim 15 wherein the display is a public display.

18. The product of claim 15 wherein the indicate signal has a first query component which solicits first reply data about the first object and wherein the first annotate data has a first reply component which represents the first reply data.

19. An annotating product used with an information system and with a plurality of objects, the product comprising:
a public imager, the public imager having a field of view, the field of view extending along each of three orthogonal axes, several objects from the plurality of objects being spatially separated in the field of view;
a plurality of coded data sources, several coded data sources from the plurality of coded data sources being spatially separated in the field of view, light from the several coded data sources being together detected by the public imager;

a plurality of person coded data sources member-by-member corresponding to person members from the plurality of coded data sources;
the several coded data sources comprising several person coded data sources from the plurality of person coded data sources;
a first person coded data source from the several person coded data sources;
a first object from the several objects;
a first indicate signal, the first indicate signal being caused when light from the first person coded data source is caused to be selected at the imager by a first alignment of the first person coded data source is maintained for a set time, the first alignment representing the first object by intersecting the first object,
the first indicate signal representing the first object, the first indicate signal being output by the public imager, the first indicate signal being input to the information system;
first annotate data associated with the first object, the first annotate signal having a first personal component, the first personal component representing first annotate data relevant specifically to a first person, the first annotate data being available to the information system;
a first annotate signal output by the information system, the first annotate signal being caused by the first indicate signal, the first annotate signal representing first annotate data; and
a display, the display receiving the first annotate signal and the display being caused by the annotate signal to output the first annotate data.

20. The product of claim 19 wherein:
a plurality of object codes member-by-member corresponds to object members from the plurality of coded data sources, the several coded data sources further comprises several object coded data sources from the plurality of object coded data sources;
the indicate signal has an object component, and the object component positionally represents the several objects.

21. The product of claim 19 wherein the display is a private display.

22. The product of claim 19 wherein the display is a public display.

23. The product of claim 19 wherein the indicate signal has a first query component which solicits first reply data about the first object and wherein the first annotate data has a first reply component which represents the first reply data.

24. An annotating product used with an information system and with a plurality of objects, the product comprising:
a public imager, the public imager having a field of view, the field of view extending along each of three orthogonal axes, several objects from the plurality of objects being spatially separated in the field of view;
a plurality of coded data sources, several coded data sources from the plurality of coded data sources being spatially separated in the field of view, light from the several coded data sources being together detected by the public imager;
a plurality of person coded data sources member-by-member corresponding to person members from the plurality of coded data sources;
the several coded data sources comprising several person coded data sources from the plurality of person coded data sources;

a first person coded data source from the several person coded data sources;

a first object from the several objects;

a first indicate signal, the first indicate signal being caused when light from the first person coded data source is caused to be selected at the imager by a first alignment of the first person coded data source is maintained for a set time, the first alignment representing the first object by intersecting the first object, the first indicate signal representing the first object, the first indicate signal being output by the public imager, the first indicate signal being input to the information system;

a plurality of object codes member-by-member corresponding to object members from the plurality of coded data sources, the several coded data sources further comprising several object coded data sources from the plurality of object coded data sources;

an object component of the indicate signal, the object component positionally representing the several objects;

first annotate data associated with the first object, the first annotate signal having a first personal component, the first personal component representing first annotate data relevant specifically to a first person, the first annotate data being available to the information system;

a first annotate signal output by the information system, the first annotate signal being caused by the first indicate signal, the first annotate signal representing first annotate data; and a display, the display receiving the first annotate signal, and the display being caused by the annotate signal to output the first annotate data.

25. The product of claim 24 wherein the display is a private display.

26. The product of claim 24 wherein the display is a public display.

27. The product of claim 24 wherein the indicate signal has a first query component which solicits first reply data about the first object and wherein the first annotate data has a first reply component which represents the first reply data.

* * * * *